Patented Nov. 1, 1938

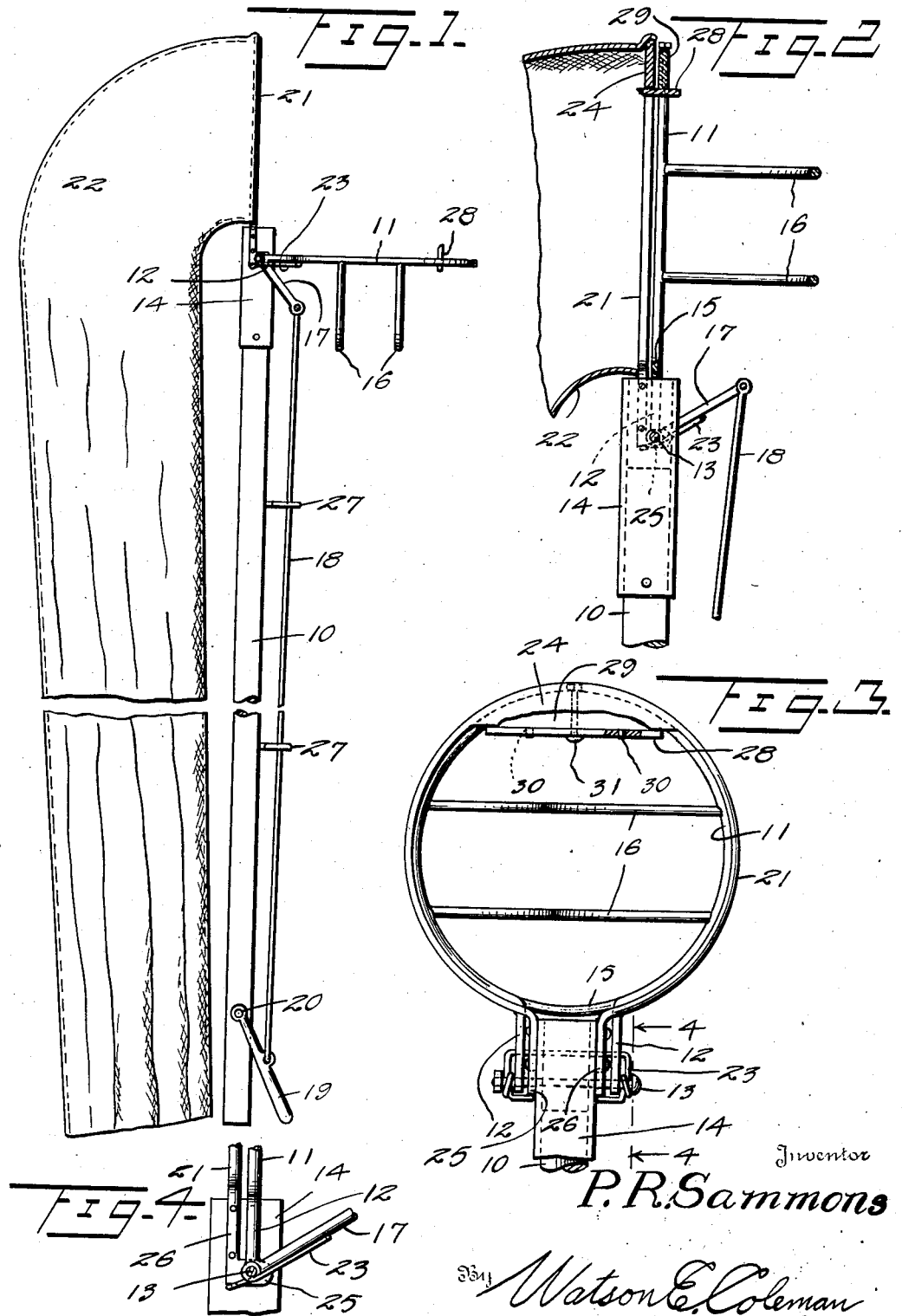

2,135,354

UNITED STATES PATENT OFFICE 2,135,354

FRUIT PICKER

Paul R. Sammons, McAllen, Tex., assignor of one-half to Freeman R. Ratcliff, Mission, Tex.

Application January 13, 1938, Serial No. 184,894

2 Claims. (Cl. 56—336)

This invention comprehends certain new and useful improvements in fruit picking devices and relates particularly to that type of fruit picking device which embodies an elongated handle portion or pole upon the upper end of which a severing device is mounted, the pole carrying a flexible fruit receiving tube contiguous to the severing device whereby the fruit may be guided when severed into a collecting receptacle or the like without bruising or otherwise injuring the fruit.

The invention has for its primary object a simple, durable and efficient device of this character embodying novel severing means which will effectively serve to cut or separate the stems of the fruit being picked, avoiding the necessity of pulling or jerking the fruit from the tree and effectively co-acting with the flexible fruit receiving guiding tube in gathering the fruit without liability of injuring the same.

With the foregoing and other objects in view, the invention will be more fully described hereinafter, and will be more particularly pointed out in the claims appended hereto.

In the drawing, wherein like symbols refer to like or corresponding parts throughout the several views, Figure 1 is a detailed side elevation partly broken away of a picker constructed according to an embodiment of this invention.

Figure 2 is a fragmentary vertical section, partly in detail, of the device in closed position.

Figure 3 is a fragmentary front elevation of the device.

Figure 4 is a fragmentary sectional view taken on the line 4—4 of Figure 3.

Referring to the drawing, the numeral 10 designates generally a handle which may be of suitable length and which is provided at its upper end with a picking means comprising a ring 11, provided with a pair of parallel arms 12, which are pivotally secured by means of a pivot 13 to a pair of ears 25, which are formed on the lower ends of a pair of parallel arms 26, carried by a stationary ring 21. The arms 26 are fixedly secured to a ferrule 14 which is slipped upon and secured to the upper end of the handle 10.

The arms 12 of the ring member 11 are connected together at their upper ends by means of a connecting bar 15 and a pair of arcuate transversely extending bars 16 are secured at their ends to the ring member 11, thereby providing an open swingable basket structure. A laterally extending or outstanding arm 17 is fixed to at least one arm 12 of the swingable basket structure and an elongated link or rod 18 is slidable through a plurality of guide eyes 27 secured to the handle 10. The lower end of the link or rod 18 is secured to a rock lever or operating member 19, which is pivotally mounted, as at 20, on the handle 10 adjacent the lower end thereof.

The stationary ring member 21 is unobstructed and entirely open and has secured thereto one end of a flexible fruit guiding tube 22, which is adapted to extend downwardly and is provided with a lower free end which may be connected to or associated with a collecting means in the form of a sack or the like which may be supported by the person operating this picking device. Manifestly the ring 21 forms a rigid support for the entrance or upper end of the guiding tube 22 to hold the mouth of the latter distended for the proper reception of the fruit as it is severed.

A spring 23 engages about the pivot 13 and normally urges the ring member 11 to a closed position, as indicated in Figure 2. The spring 23 contacts with the arm 17 and normally raises this arm with the basket structure to an uppermost or closed position. A stationary or fixed cutter 24 is carried by the stationary ring 21 and a movable blade or cutter 28 is secured to a segment 29 formed on the ring 11 and is adapted to engage with the stationary cutter 24 so as to cut the stems of the fruit. The blade 28 engages a pair of pins 30 carried by the segment plate 29 and a bolt 31 extends through the center of the blade 28 and passes through the plate 29 so as to detachably hold the movable blade 28 on the swingable ring 11.

In the use and operation of this picking device, the operating lever 19 is pulled downwardly against the tension of the spring 23, so as to hold the basket forming the ring 11 and the arcuate bars 16 in a position substantially at right angles to the length of the handle 10, as shown in Figure 1. The fruit may be positioned partially within the upper end of the tube 22 and the ring 21 whereupon the handle 19 may be released and the spring 23 will then swing the basket structure upwardly. The cutter 28 will then coact with the stationary cutter 24 in severing the stem of the fruit so that the fruit will drop downwardly and then roll down through the tube 22 into a collecting means disposed at the lower end of the tube 22.

By means of this picking device, the operating end of the picker need not be lowered each time an article of fruit has been cut off from the tree, as the fruit will roll or slide downwardly through the flexible tube 22 into the collecting device, preferably carried on the body of the picker.

This device is capable of being constructed of relatively light weight material so that the use thereof will not be an undue strain on the picker, and it will be apparent that the fruit picked by this device will not accidently fall on the ground and thereby become bruised or damaged, and, in addition, the fruit may be quickly picked without requiring the picker to ascend a ladder or the like in order to reach fruit disposed in the upper branches of the tree.

It is, of course, understood that various changes and modifications may be made in the details of construction and design of the above specifically described embodiment of this invention without departing from the spirit thereof, such changes and modifications being restricted only by the scope of the following claims.

What I claim is:—

1. A fruit picker of the character described, comprising an elongated handle, a ferrule mounted on the upper end of the handle, a stationary ring carried by the ferrule and projecting longitudinally therefrom, a movable ring pivotally mounted upon the ferrule and provided with transversely extending bars, an arm connected to the movable ring, a link rod connected to said arm and having a guiding connection with the handle, the movable ring being provided with fruit engaging means, a blade carried by the movable ring, and a relatively stationary blade carried by the stationary ring and co-acting with the first named blade, as and for the purpose set forth.

2. A fruit picker of the character described, comprising an elongated handle, a ferrule mounted on one end of said handle, a relatively stationary ring carried by the ferrule and projecting longitudinally therefrom, a movable ring pivotally mounted upon the ferrule and provided with an upstanding arm, a spring engaging said arm and tending to move the movable ring towards the stationary ring, a link rod connected to said arm and having a guiding connection with the handle, said movable ring being provided with transversely extending arcuate bars and with a segment plate, a blade secured to said segment plate, and a relatively stationary blade carried by the stationary ring and co-acting with the first named blade, as and for the purpose set forth.

PAUL R. SAMMONS.